Feb. 22, 1949.                    C. V. FIELDS                   2,462,173
                            HIGH-FREQUENCY CAPACITOR
Filed June 19, 1947                                          2 Sheets-Sheet 1
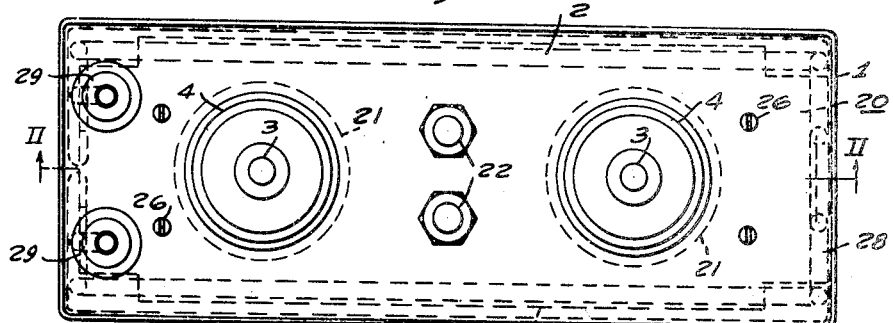
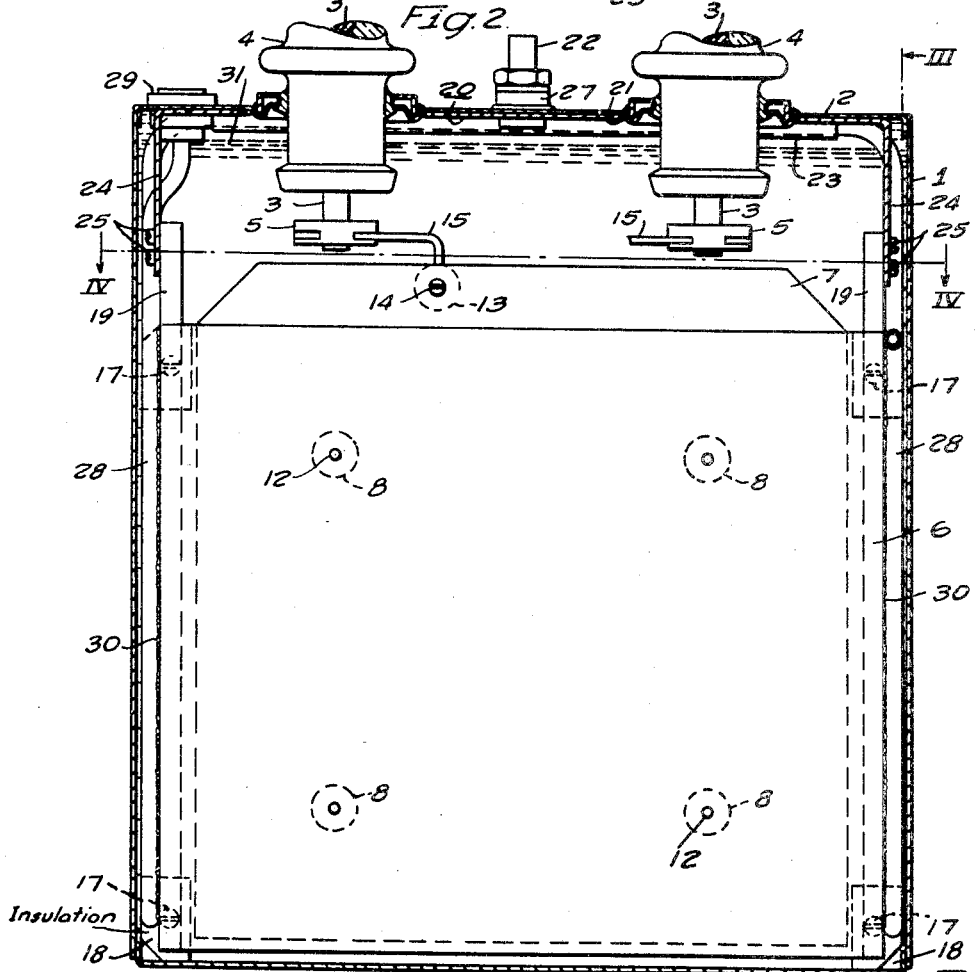
WITNESSES:                                                       INVENTOR
   E. A. McCloskey.                                          Charles V. Fields.
   New. C. Groome.                                           BY  F. P. Lyle
                                                                 ATTORNEY Feb. 22, 1949.    C. V. FIELDS    2,462,173
HIGH-FREQUENCY CAPACITOR
Filed June 19, 1947    2 Sheets-Sheet 2
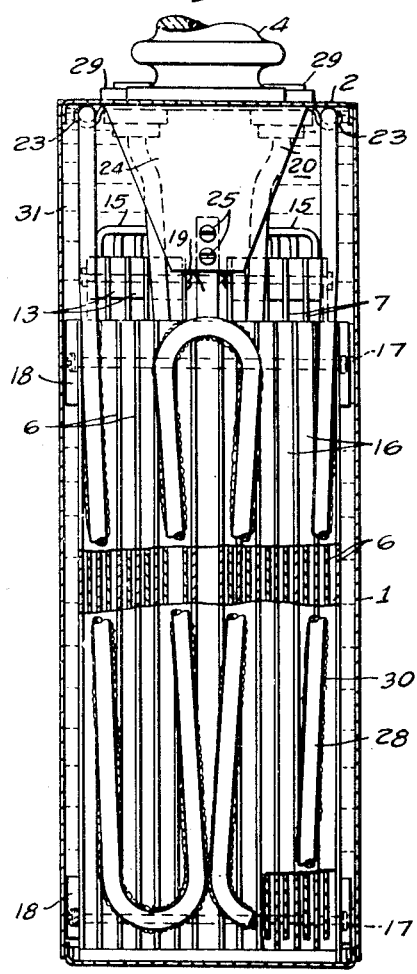
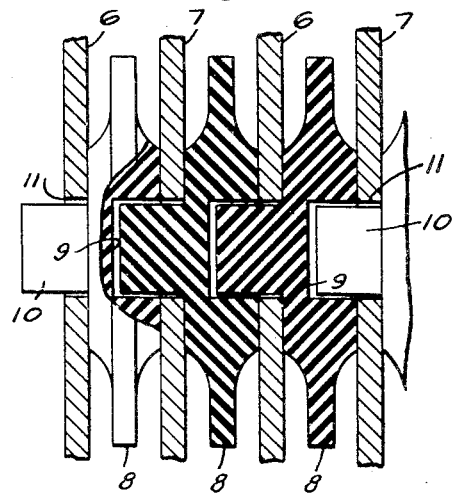
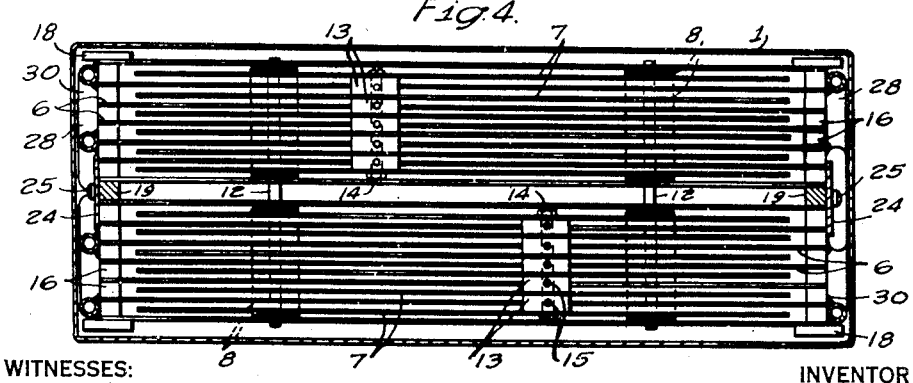
WITNESSES:    INVENTOR
    Charles V. Fields.
    BY
    ATTORNEY Patented Feb. 22, 1949

2,462,173

UNITED STATES PATENT OFFICE 2,462,173

HIGH-FREQUENCY CAPACITOR

Charles V. Fields, Pittsburgh, Pa., assignor to Westinghouse Electric Corporation, East Pittsburgh, Pa., a corporation of Pennsylvania Application June 19, 1947, Serial No. 755,757

9 Claims. (Cl. 175—41)

The present invention relates to capacitors and, more particularly, to a plate-type, liquid-dielectric capacitor for high-frequency service.

Capacitors intended for use in electronic tube oscillator circuits for generating high-frequency power must have very low losses, because of the adverse effect of losses on the performance of the circuit, and also for economic reasons because of the relatively high cost of generating power in this manner. The usual practice has been to use capacitors of the mica type as blocking and bypass capacitors, and to use capacitors having compressed gas or vacuum dielectric in the tank circuits of electronic tube oscillators. The use of these types of capacitors has been satisfactory in applications such as radio transmitters, operating on fixed frequencies with very high tank circuit voltages. The losses of capacitors of the gas-dielectric type are low enough for satisfactory and economical circuit performance, and, since these capacitors produce relatively little heat to be dissipated, they can be operated at relatively high kva. ratings.

High-frequency electronic tube oscillators are now also used for other applications, however, such as supplying power at frequencies of the order of 200 to 500 kilocycles per second, for example, for dielectric heating and similar purposes. In these applications, the tank circuit voltages are often relatively low, and capacitors of the gas-dielectric type cannot be used satisfactorily because of the necessarily wide spacing of their plates and resulting low capacitance. Mica capacitors are not satisfactory for this use since the losses in mica capacitors of the necessary size are such that a difficult problem of heat dissipation is presented, which requires an unduly large amount of radiating surface to dissipate the heat, in conventional designs. A more satisfactory type of capacitor for these applications is the plate-type capacitor with liquid dielectric. Available liquid dielectric materials have relatively high dielectric constants and dielectric strength, and thus the use of such liquids permits close spacing between the capacitor plates and increases both the capacitance and the voltage breakdown strength of the capacitor. Liquid dielectrics, however, have higher losses and thus produce more heat so that, if no special means for dissipating the heat is provided, the permissible kva. rating of the capacitor is actually lowered, as compared to a gas-filled capacitor, in spite of the increased capacitance. The losses in a liquid-dielectric capacitor, however, are not so high as to be objectionable from the standpoint of circuit performance or cost, and if the heat can be adequately dissipated, this type of capacitor is very desirable for use in the tank circuits of high-frequency oscillators.

The principal object of the present invention is to provide a plate-type capacitor having a liquid dielectric medium and in which cooling means are provided to effectively remove the heat generated by the losses.

Another object of the invention is to provide a plate-type, liquid-dielectric capacitor in which one set of plates is directly cooled by a water cooling coil, so as to obtain the most effective removal of heat.

A further object of the invention is to provide a construction for capacitors of the plate type in which the plates are supported and spaced in a novel manner which permits direct water cooling of one set of plates, and which facilitates the electrical connections to the plates.

Other objects and advantages of the invention will be apparent from the following detailed description of a preferred embodiment, taken in connection with the accompanying drawings, in which:

Figure 1 is a top plan view of a capacitor;

Fig. 2 is a longitudinal sectional view, approximately on the line II—II of Fig. 1;

Fig. 3 is a transverse sectional view, approximately on the line III—III of Fig. 2;

Fig. 4 is a horizontal sectional view, approximately on the line IV—IV of Fig. 2; and Fig. 5 is a fragmentary sectional view, on an enlarged scale, showing the means for spacing and supporting the plates.

The capacitor shown in the drawings is contained in a case 1, which may be made of steel or other suitable material, and which is of any suitable leakproof construction. The case has a metal cover 2 which is preferably made of non-magnetic material, such as stainless steel, to avoid hysteresis losses and heating in the cover. The cover 2 closes the top of the case 1 and, in the final assembly of the capacitor, the cover 2 is welded, or otherwise sealed, to the case 1 so as to be substantially leakproof and moisture-tight. Two terminal studs 3 are carried on the cover 2 and insulated from it by porcelain terminal bushings 4, which are sealed in the cover 2 in any usual or desired manner. The terminal studs 3 terminate within the case 1 in terminal blocks 5.

The capacitor consists essentially of two sets of spaced metal plates 6 and 7, which may be made of aluminum or other suitable material. The plates 6 and 7 are parallel and alternate with each other, and, as clearly shown in Figs. 2 and 4, the plates 6 extend laterally at both sides of the assembly beyond the plates 7. The plates 6 are grounded to the case 1, and will be referred to for convenience as the low-voltage plates. The high-voltage plates 7, which intervene between the low-voltage plates, extend vertically above the low-voltage plates 6.

The plates 7 are supported, from the plates 6, and the plates are spaced apart, by insulating spacer members 8 which may be made of porcelain or other suitable insulating material, preferably having a low dielectric constant, as compared to that of the liquid with which the case is filled. As shown in Fig. 5, each of the spacers 8 is generally circular, and has a recess 9 in one side and a projection 10 on the other side which is adapted to fit into the recess 9 of an adjacent spacer. The spacers 8 are placed between the plates 6 and 7 and assembled in nested relation, with the projection 10 of each spacer extending through a hole 11 in one of the plates 6 or 7 and into the recess 9 of an adjacent spacer, so that the plates are held between the spacers, the plates being clamped together at the edges, as described below. Four sets of spacers 8 are provided, disposed near the corners of the plates, and it will be seen that the spacers support the plates in spaced, parallel relation and insulate them from each other. In the preferred embodiment of the invention shown in the drawings, the plates 6 and 7 are assembled in two spaced groups, as shown in Fig. 4, and the corresponding sets of spacers 8 of the two groups of plates are connected by pins 12, which are received in the recesses 9 of the end spacers of each set, the spacers facing in opposite directions in the two groups of plates.

Metal washers or spacers 13 are placed between the high-voltage plates 7 above the upper edges of the low-voltage plates 6, for clamping the plates 7 and providing electrical connection to them. The washers 13 have central holes, and the plates 7 and spacers 13 are clamped together by means of bolts 14, which pass through the washers and through holes in the plates. One set of washers 13 is provided for each of the two groups of plates 7, and the two sets of washers 13 are offset from each other as shown in Fig. 4. Each washer 13 has a radial hole drilled in it, and leads 15 are soldered in these holes and extend to the terminal blocks 5 of the high-voltage terminal studs 3 in the cover 2, the leads from one group of high-voltage plates 7 going to one terminal stud, and the leads from the other group of plates 7 going to the other terminal stud.

The laterally extending ends of the low-voltage plates 6 are separated by vertical spacers or bars 16 of brass, or other suitable conducting material. As shown in Fig. 3, the bars 16 extend vertically for the full height of the plates 6, and substantially fill the spaces between the ends of the plates. The plates 6 and bars 16 are clamped solidly together by means of bolts 17 extending through the plates and bars at top and bottom on each side of the assembly. It will be apparent that the bars 16 and the ends of the plates 6 form a continuous, uninterrupted metallic surface at each side of the assembly of plates. The central spacer bars 19 between the two groups of plates extend vertically above the top edges of the plates 6, for the purpose of supporting the plate assembly as a whole. Insulating blocks 18 may be secured on each corner of the plate assembly by the bolts 17 to space the plates from the case 1.

A metal cooling plate and flux shield 20 is secured to the underside of the cover 2. The cooling plate 20, which is made of copper, or other suitable material, is generally coextensive with the cover 2, and has openings 21 in it to provide adequate clearance around the high-voltage terminals 4. The plate 20 carries one or more low-voltage terminal studs 22 which extend through openings in the cover 2. Two low-voltage terminal studs have been shown, but as many terminal studs 22 may be provided as are necessary to carry the intended currents. The side edges of the cooling plate 20 are bent down and formed into generally trough-shaped portions 23 extending longitudinally of the case 1. Each end of the cooling plate 20 is bent down to form a depending portion 24, and the vertically extending central spacer bars 19 are attached to the portions 24 by means of screws 25, so as to suspend the assembly of plates 6 and 7 from the cover 2. The cooling plate 20 is firmly secured to the underside of the cover 2 in any suitable manner, as by means of screws 26 which pass through the cover and are threaded into the plate 20, the screws 26 being soldered over after assembly of the capacitor to seal them. The terminal studs 22 pass through openings in the cover 2 and a round nut 27 is threaded on each of the terminal studs to aid in clamping the plate 20 to the cover 2, the nuts 27 being soldered to the cover after they have been tightened.

As previously explained, the losses in a capacitor of the liquid-dielectric type are such that a considerable amount of heat is generated, which must be dissipated in order to obtain the maximum kva. capacity. For this purpose, a water cooling coil 28 is provided in the capacitor of the present invention. The coil 28 is preferably formed from a single piece of copper tubing, and its ends are connected to bushings 29 passing through one end of the cover 2. The configuration of the cooling coil will be apparent from the drawings. Starting from one of the bushings 29, the coil forms a vertical loop at that end of the capacitor, and then runs horizontally at the top of the case 1 to the opposite end of the case where it forms two vertical loops, shown in Fig. 3, which lead to a second horizontal portion at the top of the capacitor running back to the first end of the case 1, where a second vertical loop is formed at that end, and thus to the other bushing 29. The cooling coil 28 is proportioned so that the vertical loops at each end of the case 1 are in contact with the continuous metallic surfaces formed by the bars 16 and the ends of the plates 6, and the coil 28 is soldered to these surfaces, as indicated at 30, or otherwise joined to these surfaces to form a permanent connection of good thermal and electrical conductivity. The horizontal portions of the cooling coil at the top of the case are disposed in the trough-shaped portions 23 of the cooling plate 20, and are soldered to the cooling plate throughout its length. After assembly of the capacitor is completed, the case 1 is substantially completely filled with a liquid dielectric medium 31, which may be mineral oil, or preferably a non-inflammable synthetic material of high dielectric constant such as chlorinated diphenyl.

It will be apparent that the direct soldered connection of the cooling coil 28 to the low-voltage plates 6 provides very effective cooling, since heat generated in the plates and in the liquid dielectric 31 flows through a direct metallic path of low thermal resistance to the water circulating in the cooling coil 28. In this way, the heat is effectively removed, and the capacitor can be given a relatively high kva. rating to take full advantage of the high capacitance obtainable in this type of capacitor. The cooling plate and flux shield 20 secured to the underside of the cover 2 also aids in the removal of heat since it is directly cooled by its soldered connection to the cooling coil, and thus provides a direct thermal path to the cooling water for heat generated in the cover 2 or flowing to it from the external leads or bus bars. The plate 20 also acts as a flux shield to keep the magnetic flux produced by the high-frequency currents in the leads 15 from entering the cover and causing eddy-current heating of the cover.

The capacitor described above also has certain other advantages. Thus, the use of the nested insulating spacer members 8 for supporting and spacing the plates 6 and 7 is very advantageous since it permits relatively large tolerances in the spacing of the plates 6 by the bars 16, for the reason that errors between individual plates are not cumulative. This makes the use of the spacer bars 16 practical, since slight variations in their width and in the spacing between adjacent plates 6 are not serious. The use of the insulating spacers 8 also provides a relatively inexpensive and simple means of insulating the plates and supporting them from each other, the entire assembly being suspended from the cover 2 by means of the extended bars 19.

In the preferred embodiment of the invention shown in the drawings, the plates 6 and 7 are divided into two groups, and the high-voltage plates of the two groups are connected to different terminals. This arrangement is desirable since it permits some flexibility in the use of the capacitor. Thus, the two groups of plates may be connected in parallel by connecting the two high-voltage terminal studs 3 together and connecting the line leads to one of the terminal studs 3 and to the low-voltage terminal studs 22, which are connected to the low-voltage plates 6 through the cooling plate 20 and the coil 28 and bars 19. Alternatively, the two groups of plates may be connected in series by connecting the line leads to the high-voltage terminal studs 3, giving one-fourth the capacitance at twice the voltage rating. Thus, this arrangement permits a certain amount of flexibility in the application of the capacitor. It will be understood, however, that, if desired, only a single group of plates 6 and 7 might be utilized, in which case all the high-voltage plates 7 could be connected to a single insulated high-voltage terminal stud.

It should now be apparent that a high-frequency, plate-type, liquid-dielectric capacitor has been provided in which the heat generated by the losses is very effectively removed so as to permit operation at very high kva. ratings. A preferred embodiment of the invention has been shown and described for the purpose of illustration, but it will be obvious that various other embodiments and modifications are possible within the scope of the invention. The invention is not restricted, therefore, to the particular details of construction shown but, in its broadest aspects, it includes all equivalent embodiments and modifications which come within the scope of the appended claims.

I claim as my invention:

1. A capacitor comprising a case, a plurality of metal plates disposed in said case in parallel relation and spaced from each other, alternate plates extending laterally beyond the intervening plates, and the intervening plates extending vertically above the first-mentioned plates, metal spacer members disposed between the extending ends of said laterally extending plates, said metal spacer members substantially filling the spaces between the ends of the laterally extending plates, whereby the spacer members and the ends of the plates form a continuous surface, a cooling coil in said case adapted for circulation of a liquid cooling medium, said cooling coil being disposed in contact with the surface formed by the spacer members and laterally extending plates and joined thereto with a connection of good thermal and electrical conductivity, terminal means on the case, means for electrically connecting said vertically extending plates to said terminal means, and a liquid dielectric medium substantially filling the case.

2. A capacitor comprising a case, a plurality of metal plates disposed in said case in parallel relation and spaced from each other, alternate plates extending laterally beyond the intervening plates at both sides thereof, and the intervening plates extending vertically above the first-mentioned plates, vertically extending metal spacer members disposed between the ends of said laterally extending plates at both ends thereof, said metal spacer members substantially filling the spaces between the ends of the laterally extending plates, whereby the spacer members and the ends of the plates form continuous surfaces at each end of the plates, a cooling coil in said case adapted for circulation of a liquid cooling medium, said cooling coil being disposed in contact with the surfaces formed by the spacer members and the laterally extending plates and joined to said surfaces with a connection of good thermal and electrical conductivity, terminal means on the case, means for electrically connecting said vertically extending plates to said terminal means, and a liquid dielectric medium substantially filling the case.

3. A capacitor comprising a case, a cover closing the top of said case, a plurality of metal plates disposed in the case, means for supporting said plates in parallel relation, said supporting means spacing the plates apart and insulating them from each other, alternate ones of said plates extending laterally beyond the intervening plates, and the intervening plates extending vertically above the first-mentioned plates, metal spacer members disposed between the ends of the laterally extending plates, said metal spacer members substantially filling the spaces between the ends of the laterally extending plates, whereby the spacer members and the ends of the plates form a continuous surface, a cooling coil in said case adapted for circulation of a liquid cooling medium, said cooling coil being disposed in contact with the surface formed by the spacer members and laterally extending plates and joined thereto with a connection of good thermal and electrical conductivity, means for supporting the complete assembly of plates from said cover, terminal means on the cover, means for electrically connecting said vertically extending plates to the terminal means, and a liquid dielectric medium substantially filling the case.

4. A capacitor comprising a case, a cover closing the top of said case, a plurality of metal plates disposed in the case, means for supporting said plates in parallel relation, said supporting means spacing the plates apart and insulating them from each other, alternate ones of said plates extending laterally beyond the intervening plates at both sides thereof, and the intervening plates extending vertically above the first-mentioned plates, vertically extending metal spacer members disposed between the ends of said laterally extending plates at both ends thereof, said metal spacer members substantially filling the spaces between the ends of the laterally extending plates, whereby the spacer members and the ends of the plates form continuous surfaces at each end of the plates, a cooling coil in said case adapted for circulation of a liquid cooling medium, said cooling coil being disposed in contact with the surfaces formed by the spacer members and the laterally extending plates and joined to said surfaces with a connection of good thermal and electrical conductivity, means for supporting the complete assembly of plates from said cover, terminal means on the cover, means for electrically connecting said vertically extending plates to the terminal means, and a liquid dielectric medium substantially filling the case.

5. A capacitor comprising a case, a cover closing the top of said case, a plurality of metal plates disposed in the case, means for supporting said plates in parallel relation, said supporting means spacing the plates apart and insulating them from each other, alternate ones of said plates extending laterally beyond the intervening plates at both sides thereof, and the intervening plates extending vertically above the first-mentioned plates, vertically extending metal spacer members disposed between the ends of said laterally extending plates at both ends thereof, said metal spacer members substantially filling the spaces between the ends of the laterally extending plates, whereby the spacer members and the ends of the plates form continuous surfaces at each end of the plates, a cooling coil in said case adapted for circulation of a liquid cooling medium, said cooling coil being disposed in contact with the surfaces formed by the spacer members and the laterally extending plates and joined to said surfaces with a connection of good thermal and electrical conductivity, at least one of said metal spacing members at each end of the plates extending above the laterally extending plates, means for suspending said extending spacer members from said cover to support the complete assembly of plates from the cover, terminal means on the cover, means for electrically connecting said vertically extending plates to the terminal means, and a liquid dielectric medium substantially filling the case.

6. A capacitor comprising a case, a cover closing the top of said case, a plurality of metal plates disposed in the case, means for supporting said plates in parallel relation, said supporting means spacing the plates apart and insulating them from each other, alternate ones of said plates extending laterally beyond the intervening plates at both sides thereof, and the intervening plates extending vertically above the first-mentioned plates, vertically extending metal spacer members disposed between the ends of said laterally extending plates at both ends thereof, said metal spacer members substantially filling the spaces between the ends of the laterally extending plates, whereby the spacer members and the ends of the plates form continuous surfaces at each end of the plates, a cooling coil in said case adapted for circulation of a liquid cooling medium, said cooling coil being disposed in contact with the surfaces formed by the spacer members and the laterally extending plates and joined to said surfaces with a connection of good thermal and electrical conductivity, at least one of said metal spacing members at each end of the plates extending above the laterally extending plates, a metal cooling plate secured to the underside of said cover, said cooling plate having depending portions at each end thereof, means for securing said extending spacer members to said depending portions of the cooling plate, terminal means on the cover, means for electrically connecting said vertically extending plates to the terminal means, and a liquid dielectric medium substantially filling the case.

7. A capacitor comprising a case, a cover closing the top of said case, a plurality of metal plates disposed in the case, means for supporting said plates in parallel relation, said supporting means spacing the plates apart and insulating them from each other, alternate ones of said plates extending laterally beyond the intervening plates at both sides thereof, and the intervening plates extending vertically above the first-mentioned plates, vertically extending metal spacer members disposed between the ends of said laterally extending plates at both ends thereof, said metal spacer members substantially filling the spaces between the ends of the laterally extending plates, whereby the spacer members and the ends of the plates form continuous surfaces at each end of the plates, a cooling coil in said case adapted for circulation of a liquid cooling medium, said cooling coil being disposed in contact with the surfaces formed by the spacer members and the laterally extending plates and joined to said surfaces with a connection of good thermal and electrical conductivity, at least one of said metal spacing members at each end of the plates extending above the laterally extending plates, a metal cooling plate secured to the underside of said cover, the cooling coil having a portion disposed in good heat-exchange relation to the cooling plate, the cooling plate having depending portions at each end thereof, means for securing said extending spacer members to said depending portions of the cooling plate, terminal means on the cover, means for electrically connecting said vertically extending plates to the terminal means, and a liquid dielectric medium substantially filling the case.

8. A capacitor comprising a case, a plurality of metal plates in said case, means for supporting said plates, said supporting means including a plurality of nested insulating spacers adapted to support the plates between them in parallel, spaced relation, alternate ones of said plates extending beyond the intervening plates, means for effecting electrical connection to said intervening plates, means for directly cooling said extending plates and for effecting electrical connection thereto, and a liquid dielectric medium substantially filling the case.

9. A capacitor comprising a case, a plurality of metal plates in said case, means for supporting said plates, said supporting means including a plurality of insulating spacers, each of said spacers having a recess in one side and a projection on the other side adapted to fit into the recess of an adjacent spacer, the plates having holes therein to receive the projections of the spacers, the spacers being assembled in nested relation with a plate held between each adjacent pair of spacers, whereby the spacers support the plates in parallel, spaced relation, alternate ones of said plates extending beyond the intervening plates, means for effecting electrical connection to said intervening plates, means for directly cooling said extending plates and for effecting electrical connection thereto, and a liquid dielectric medium substantially filling the case.

CHARLES V. FIELDS.

REFERENCES CITED

The following references are of record in the file of this patent:

UNITED STATES PATENTS

| Number | Name | Date |
|---|---|---|
| 897,500 | Taylor | Sept. 1, 1908 |

FOREIGN PATENTS

| Number | Country | Date |
|---|---|---|
| 395,420 | Great Britain | July 20, 1933 |